Patented June 29, 1948

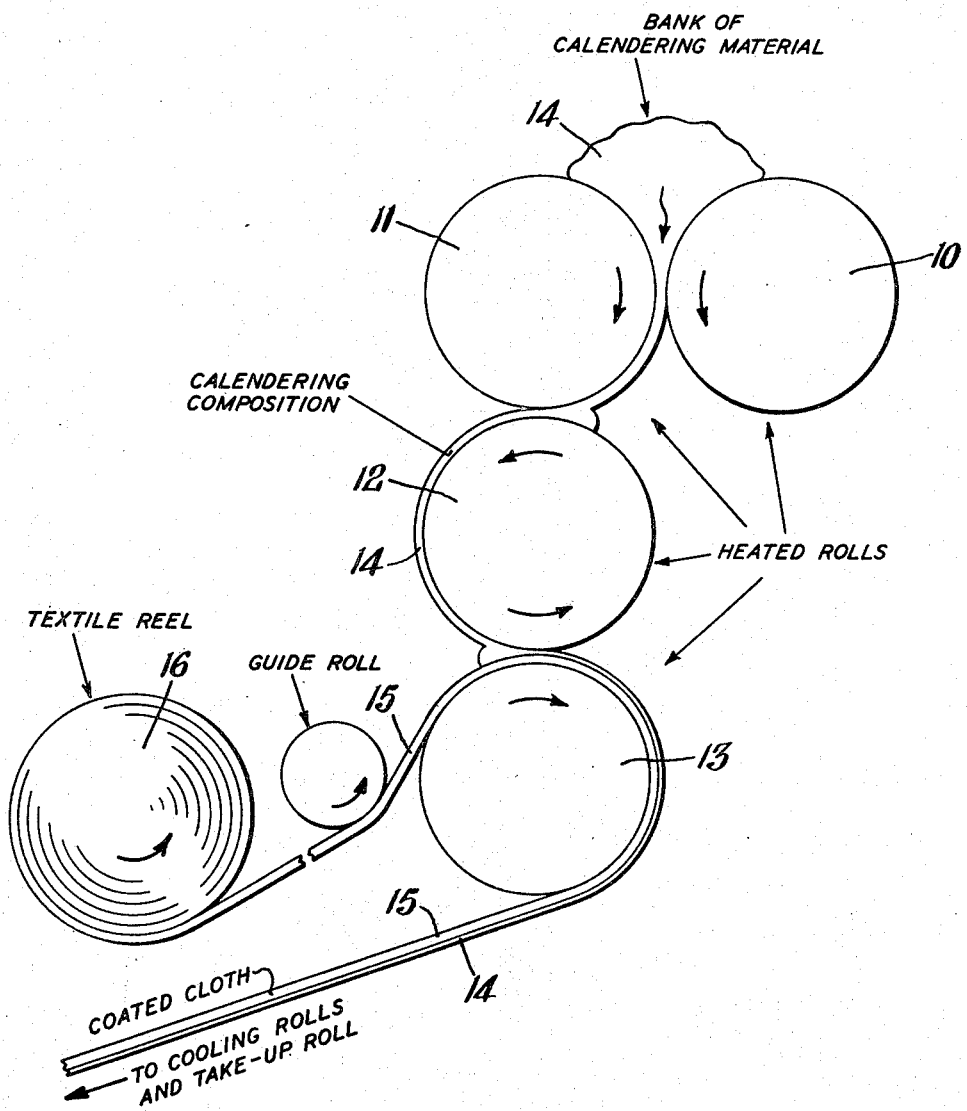

2,444,094

UNITED STATES PATENT OFFICE 2,444,094

RESIN COATED FIBER BASE AND PROCESS OF MAKING

Fred W. Duggan, Bound Brook, N. J., assignor to Bakelite Corporation, a corporation of New Jersey Application August 4, 1943, Serial No. 497,395

2 Claims. (Cl. 154—97.5)

This invention relates to fibrous bases or textiles coated with vinyl resins and vinyl resin compounds, particularly those which are polymers of vinyl halides or are copolymerization products of vinyl halides with vinyl esters of carboxylic acids.

For many purposes in the arts, it is desired to provide a fibrous or textile base with a firmly adherent coating of a vinyl resin composition which is rubbery and yet does not soften readily under heat, and is relatively inert and insoluble in the usual solvents; and to coat the base with such a resin composition as expeditiously and at as low a cost as is possible. But the very characteristics of the resins and compositions which are used as coatings and which render them desirable in the finished article, have heretofore made them difficult or costly to apply to the textile or other base in an expeditious manner, at a low cost and with a satisfactory union between the resin or the resinous composition and the base. By way of example, it is desired to provide a coated fabric as quickly and at as low a cost as is possible for service in the final form of tarpaulins, engine hoods, rain coats and the like. These articles, and particularly the coatings, must be resistant to change caused by atmospheric influences, rain, salt water and the like; they must be non-toxic; they should be characterized by lack of odor and taste; they must be strong, rubbery, resistant to abrasive wear and to fatigue flexing; they must be tough yet flexible, stable towards light and heat, and durable; the coating materials must be dry and non-tacky and capable of taking a high finish so that dirt does not adhere or can easily be removed; and, quite important, the coatings must not separate from the textile base under the conditions of continued hard use yet in the manufacture of the coated article, the coatings must be applied as expeditiously as possible to provide the large quantities required yet the cost must be kept at a minimum.

An object of the present invention is to provide a coated textile or fibrous base which meets the above requirements as nearly as possible.

In general, I have found those desirable physical and chemical characteristics of strength, rubberiness, toughness, inertness, flame resistance, weather resistance and the like, in compositions comprising a plasticizer and those vinyl resins which are, or contain a high proportion of, a vinyl halide, for instance polymerized vinyl chloride or bromide or copolymerization products of the vinyl halides with vinyl esters of the lower carboxylic acids, for instance the vinyl esters of formic, acetic, propionic, butyric, valeric, and caproic acids having up to and including 6 carbon atoms, or copolymerization products of the vinyl halides with other vinyl compounds, for instance acrylonitrile.

But these vinyl resins which have the most desirable characteristics as coatings also have the common characteristic that they are "substantially insoluble" in acetone and in many other low cost fluids. In explanation of the terms "substantially insoluble" and "substantially insoluble resins" it should be understood that when the monomers are maintained in any given proportion and are polymerized to give the resins, all of the polymeric molecules are considered to have the same chemical composition but not all of the polymeric molecules have the same molecular weight, for instance in a vinyl copolymer resin which is a copolymer of vinyl chloride and vinyl acetate and is said to have a "molecular weight" or an "average molecular weight" of 30,000 the resin may be a mixture containing polymeric copolymer molecules having molecular weights higher and lower than 30,000. The average molecular weight of the copolymer resin as determined by test, however, is 30,000 and there is a minimum of at least 30% by weight of the resin which will not dissolve in acetone at 25° C. no matter how much acetone is used. Such a resin, that is, one of which 30% or more will not dissolve in acetone at 25° C., is referred to as "substantially insoluble." In the case of a straight polyvinyl chloride resin, the minimum macromolecular weight of the resin to give this insolubility may be as low as 12,000, as determined by Staudinger's formula, and in the case of a copolymer containing about 95% of vinyl chloride and 5% of vinyl acetate, the macromolecular weight may be as high as about 40,000. In general, the higher the proportion of chloride, the less soluble is the resin in acetone for any given molecular weight. Of course, resins of greater acetone solubility may be applied according to the present invention but the resins of lesser solubility and compositions containing them are those which are particularly desirable for coatings and which have heretofore been difficult to apply to bases with a firm adherence and by expeditious and low cost methods to give a satisfactory product.

The resins and coating compositions prepared therefrom are of the permanently thermoplastic type, that is, they can be resoftened a number of times by repeated applications of a sufficiently high temperature and they do not, as do the heat reactive resins or vulcanized rubber, first soften and then become appreciably harder as heat is applied. When correctly plasticized, these resins give rubbery compositions having the aforesaid desirable characteristics which make the compositions desirable for the purposes mentioned, but neither the substantially insoluble polymeric resins nor the compositions soften sufficiently at reasonable temperatures, that is at temperatures below 90° C., to be applied satisfactorily directly to the textile by a calendering process; and even at temperatures above 90° C., they do not "wet" or adhere to the textile; such union as is obtained by calendering directly onto cloth is that resulting merely from the pressing of the resin against the surface of the textile and somewhat into the relatively large irregularities or interstices of the textile; and when the coating layer is pulled, the threads or fibers of the textile yield, thus permitting the coating to pull out of the interstices and away from the surface.

If it be endeavored to treat the textile with a solution of the resin or composition, other difficulties arise. The resins and compositions are substantially insoluble in acetone and in a large number of the most common solvents, and have only a limited solubility in others; for instance, a copolymer of vinyl chloride and vinyl acetate polymerized directly from a mixture of the monomers without the use of a solvent or a suspending medium, and having a molecular weight of approximately 24,000 and containing about 95% of vinyl chloride, is only 25% soluble in acetone at 40° C. and, although soluble in the relatively expensive solvents such as mesityl oxide, can be dissolved therein to the extent of only about 6% at 25° C. before it forms a gel. In general, compositions of the resins with the usual plasticizers, for instance dioctyl phthalate, are insoluble in the common solvents, at best merely swelling under the influence of the solvent. Moreover, even though a solvent such as mesityl oxide be used, the resins and their compositions are, at best, so sparingly soluble that to obtain a textile with a coating of sufficient thickness to make an engine hood which will withstand hard usage, such a large number of solution treatments are necessary that the process is too long and costly to be practical. Some of the difficulties are that, as the resins and compositions are so sparingly soluble even for instance in mesityl oxide, relatively large quantities of solvent are required; it takes an appreciable time for so much solvent to volatilize; the solvent is either lost or there is the expense of its recovery; and after the solvent is volatilized there is only relatively little resin left on the textile. Moreover, if it be attempted to build up on the textile a relatively thick coating of the substantially insoluble resins or compositions from a solution or a varnish, each coating layer applied is exceedingly tender, tacky and liable to injury, at least until the solvent has volatilized; and it is difficult as a practical matter, to manipulate the flexible coated textile from the time that one solution coating is applied until the next coating is applied, as the cloth cannot be rolled up while solvent is present nor can anything be allowed to touch the tender coating else there is a break or a weak spot in the coating. Due to these facts, building up a coating layer of the necessary thickness by solution coating is out of the question from a practical point of view.

If it be attempted to treat the textile first with a solution of the insoluble resin (for instance a mesityl oxide solution) and then to calender on a coating of the resin or a composition including it, it is found that the calendered resin or composition does not adhere well to the solvent-deposited resin. The resins and compositions which I prefer to use as coatings will not adhere strongly to cloth when applied directly thereto at temperatures of 150° C. under a pressure of 100 pounds per square inch but may be pulled apart quite readily. The compositions are rubbery in character and have the aforesaid desired characteristics coupled with these undesirable characteristics.

I have been able to overcome the difficulties heretofore experienced and provide a satisfactorily coated textile or paper and take advantage of the characteristics of the substantially insoluble resins and their compositions in a relatively simple manner. I have discovered that if the textile is first treated so that its threads or fibers are impregnated with or encased in a resin resulting from the copolymerization of a vinyl compound and a substance such as maleic acid, a coating layer of a substantially insoluble resin or composition of the previously described type having any desired or practical thickness will hold to the treated textile with unexpected tenacity even though the coating layer be merely calendered on at a temperature as low as 135° C., no mutual solvents or other adhesion-aids and no baking being used. For instance, as described hereinafter, a coating layer of a tough substantially insoluble resin composition adhered to a treated cloth with such tenacity that the coating tore before it lost its hold on the treated texile.

For the purpose of illustrating the invention and the parts thereof, by means of concrete examples, reference may be had to the following, it being understood that numerous variations may be made, as indicated elsewhere herein, as this description would be unduly extended by giving examples of all formulae of impregnating compositions and coating compositions and of all methods of applying the compositions to the base.

*Impregnating resin and treatment of the base*

A suitable impregnating resin is a copolymer containing by weight about 86% vinyl chloride, about 0.78% of maleic acid and the remainder vinyl acetate and having an average macromolecular weight of about 10,000. A solution of the resin in acetone (20% resin, 80% acetone) had a viscosity of 21.0 seconds as determined by the Ford cup test using a No. 4 tip. The specific viscosity of the resin was 0.567 as determined by the Ubbelohde suspended-level viscosimeter. In this test the specific viscosity is the relative increase in the viscosity of a solvent caused by the solute. The specific viscosity is expressed as $$\frac{\text{corrected time for solution}}{\text{corrected time for solvent}} - 1$$

The test is run at 20° C. and the resin solution tested is 1 gram of dried resin dissolved in sufficient methyl isobutyl ketone to make a total volume of 100 cc.

The maleic acid is representative of the alpha, beta-olefinic unsaturated carboxylic acids, their anhydrides, and acidic or partial esters and salts, that is esters or salts of polycarboxylic acids of this type having at least one free carboxylic group. Other representative acids and derivatives are fumaric acid, benzyl maleic acid, citraconic acid, itaconic acid, phenyl maleic acid, chloro-maleic acid, crotonic acid, acrylic acid, and methacrylic acid, and their anhydrides and acidic salts and esters. All of these acids, acid anhydrides, acidic esters and acid salts are included within the term "acid" as used herein. By reference herein to maleic acid it is to be understood that this acid is merely representative of the other acids, anhydrides and acid esters and salts of the above types and is referred to merely by way of example. The action of these materials appears to be dependent upon the number of carboxylic groups presented and for equivalence to maleic acid, the number of carboxylic groups and the molecular weight of the acid or anhydride or acidic salt or ester should be taken into account.

In the matter of the impregnating resin or composition, it is important that at least one of the acidic groups of the acid be free, that is that the acid not be completely neutralized. In other words, neutral salts or esters of the acid do not give the peculiar results obtained by the use of the acid, and this is true no matter whether the neutral salts or esters are originally copolymerized with the vinyl compounds, or the acid or anhydride is originally copolymerized with the vinyl compounds and then the acid in the copolymer is neutralized. It is also important that the maleic acid be chemically combined in the impregnating resin as the desired result is not obtained by first forming a resinous polymer of, for instance, vinyl chloride or vinyl acetate or a copolymer of vinyl chloride and vinyl acetate, and then attempting physically to mix the acid or anhydride or a salt or ester thereof, into the resin.

The type of vinyl compound or mixture of compounds with which the acid is copolymerized appears to make very little difference in the matter of adhesion of the coating resin to the treated base. The macromolecular weight of the resin with which the base is treated also appears to make little difference so far as the adhesion of the impregnating resin to the substantially insoluble coating resin is concerned. Thus maleic acid or its equivalent may be copolymerized with vinyl chloride to give a copolymer of vinyl chloride and maleic acid or the maleic acid may be copolymerized with vinyl acetate, or with acrylonitrile or with both vinyl chloride and vinyl acetate with or without acrylonitrile or other suitable vinyl compounds. However, it is preferred to copolymerize the maleic or other acid or anhydride or acid ester or salt with both vinyl chloride or other halide and vinyl acetate or other vinyl ester of a low molecular weight carboxylic acid to obtain the advantages of such a resin, for instance the advantages of toughness, flexibility, water resistance and the like which are provided by a resinous copolymer of vinyl chloride and vinyl acetate as distinguished from a polymer of vinyl chloride or of vinyl acetate.

In addition to the preference for a resin which is a copolymer of the maleic acid, vinyl halide or vinyl ester, it is preferred that the resin be such that it is soluble in organic solvents, preferably in organic solvents of the type to which the finished article will not be subjected, and insoluble in liquids of the type to which the finished article will be subjected. For instance, a raincoat is usually not subjected to acetone but may be subjected to alcohol and consequently the impregnating composition is preferably of the type which is soluble in acetone and insoluble in alcohol. For this reason, it is preferred that the impregnating resin not be a copolymer of straight vinyl acetate with maleic acid; such a resin is perfectly satisfactory for bonding with the substantially insoluble coating resin but is attacked by water and alcohol. If the impregnating resin is the preferred copolymer of maleic acid, vinyl chloride and vinyl acetate, a simple manner of obtaining the required solubility for impregnating the textile base is to use a resin of a sufficiently low molecular weight to be soluble in acetone or other preferred or suitable solvent, that is a resin which has a macromolecular weight between about 7,000 and 15,000. Higher molecular weight resins may, however, be used with more powerful solvents. Also, although it is preferred to impregnate the base by means of a resin solution, which may be thin or viscous or a near-gel, a resin which can be softened sufficiently (for instance by heat) so that it can be calendered into the base (as distinguished from being calendered onto the base), may be used. In case a resin is to be calendered into the base, it may, if necessary, be softened with a small amount of a solvent, preferably one which is only slowly volatile under the calendering conditions, for instance a material having a volatility about that of dimethyl sebacate, which is intermediate between a solvent which is usually classed as "volatile," for instance acetone, and a material which is substantially non-volatile and is usually classed as a "plasticizer" for instance tricresyl phosphate. If the resin is softened with sufficient solvent to give it a viscous or syrupy or near-gel consistency, sufficient penetration of an open base, for instance cloth, may be effected through application of the composition by means of a roll coater, knife or doctor. In case too much resin is applied to the surface, the excess is preferably scraped off. Then when the solvent volatilizes, the resin shrinks leaving a small amount of resin in the textile and sometimes as a web bridging the threads. Thus, by whatever means and in whatever form the acid copolymer resin is applied to the fibrous base, this resin must interlock around or lie in the fibers of the base and not merely lie on the surface of the base. If the resin is applied by means of a solution or emulsion or dispersion, the fluids must at least carry the resin well into the base and preferably into the fibers; and if the resin is applied as a plastic composition, the composition must be sufficiently soft and in such a physical state, that it will penetrate into the base, preferably also penetrating the fibers, and coalesce within the base to encase the fibers. The ultimate object of the treatment of the base with the acid copolymer impregnating resin is to get this resin into an intimate gripping and firm union with the fibrous base and then take advantage of the property of this resin readily to amalgamate or unite, in the absence of solvents, with a composition containing the substantially insoluble coating resin; and the preferred manner of getting the maleic acid-vinyl resin copolymer into the base is by means of a solution comprising a readily volatile solvent, the solution being applied either by spraying brushing, dipping, or roll, knife, doctor or other treatment. The impregnated base does not have to be handled with the same care as a solvent-coated base, as the impregnated base need not be imporous and there need be no continuous unbroken film.

The maleic acid-copolymer resin may contain as little as 0.5% of maleic acid or as much as 10% by weight of maleic acid, but if the acid is present in the resin beyond this higher amount, the character of the resin begins to change and the base may be affected. It is preferred that the resin with which the base is treated contain a maximum of 2% by weight of carboxyl groups. Excellent results have been obtained, however, when the resin for treating the base contains 5.8% by weight of maleic acid giving 4.5% by weight of carboxyl groups. The weight of other acids, or the acid esters, or acid salts or the anhydride of each which should be used, should be determined on the basis of the free carboxyl groups in the acid, ester or salt or the potential carboxyl groups in the anhydride. The resins used for treating the base are a separate invention and are disclosed in the United States patent application of W. E. Campbell, Jr., Serial No. 446,696, filed June 12, 1942, now Patent No. 2,329,456, dated September 14, 1943.

The amount of impregnating resin applied to the fibrous base is preferably kept at a minimum. The weight of resin per pound of cloth, paper or other base will, of course, depend upon the characteristics of the base, for instance the closeness of the weave, the porosity of the base, its absorptive characteristics and the like, but it is preferred that the surface of the fibrous base does not carry a continuous planular unbroken film of the impregnating resin separating the substantially insoluble coating composition from the fibers, in other words, it is preferred that the base be open. The maximum amount of impregnating composition which is on the surface of either the fibers or threads or on the surface of the base is preferably no more than will fuse into the coating composition when the coating composition is calendered onto the treated base. Stated in another way, for maximum effectiveness, it is preferred that there not be a distinct layer of the impregnating composition between the coating composition and the base but rather a zone of merging, fusion, or amalgamation of the impregnating composition with the coating composition at the surface of the threads or fibers of the base. It has been discovered that an impregnating resin of the type described will give such a union whereas a resin which is the same in all respects save for the presence of the acid polymerized into the resin, will not. Thus, the cloth, paper or other base may contain as little as about 0.05 pound of resin per pound of cloth. This gives as little as 0.0003 pound of maleic acid per pound of cloth or as little as 0.00023 pound of carboxyl (—COOH) groups per pound of cloth; and a feature of the invention is that such an extremely small amount of the maleic acid will produce such a profound effect with respect to the adherence of the substantially insoluble coating resin or composition in the absence of solvents, one advantage being that the minute quantity of acid will produce the desired results yet the quantity of the acid is so small that it does not in any way tenderize or otherwise harm the base even though it is in the form of an acid and not a neutral salt or ester. Of course, larger amounts of acid per weight of resin and per pound of cloth may be used, and the base may contain up to 0.3 pound of the maleic acid copolymer resin per pound of cloth. So far as adhesion of the calendered coating to the treated base is concerned, optimum results are obtained when the base contains from 0.0005 to 0.005 pound of carboxyl groups per pound of base. For general purposes merely impregnating the base with the minimum amount of the impregnating resin as previously described, is entirely satisfactory.

For impregnating textile, a solution of this maleic acid copolymer resin was made comprising about 6% of the resin and 94% of acetone. The resin in the solution may conveniently be from about 3% to about 8%. Coutil cloth (100 x 90 count, about 0.012 inch thick and weighing about 0.40 pound per square yard) was run through the solution slowly enough for the solution to impregnate the cloth, the excess liquid being removed continuously by means of a scraper blade as the cloth emerged from the solution. The treated cloth was air dried overnight, during which time all of the acetone evaporated. The 6% resin solution deposited approximately 9 grams of the resin per square yard in and on the fibers of the cloth. A 3% solution will deposit about 5 grams of resin per square yard of this cloth and an 8% solution will deposit about 12 grams of resin per square yard of cloth. These amounts of resin do not undesirably affect the feel of the cloth nor its flexibility nor impair the qualities of the cloth for its ultimate use. In the case of heavy duck such as is used for life rafts (20 x 20 count, about 0.030 inch thick and weighing about 1.25 pound per square yard) about 50 grams of the impregnating resin per square yard will be deposited in the duck from a 5% solution of the resin in acetone and the duck will be somewhat stiffened.

Coating resin and composition

A suitable coating resin is a copolymer containing by weight about 95% of vinyl chloride and about 5% vinyl acetate. The average macromolecular weight of the resin is about 24,000 and the resin is only 25% soluble in acetone at 25° C.

In order for such a substantially insoluble resin to have sufficient flexibility and rubbery characteristics to be used as, for instance, the preferred surface or coating layer of a raincoat, it may be necessary to plasticize the resin as previously described. The plasticizer should be one of those which exert their plasticizing action but are water insoluble and have no tendency to make the resin wear or scuff more quickly than if the plasticizer were omitted.

For the preferred coating composition a plasticizer, for instance dioctyl phthalate, is milled with the resin so that the coating composition is a homogeneous mass containing from about 30% to about 45% of the plasticizer.

Such other components as resin stabilizers, lubricants and the like may be incorporated in the coating composition, as desired. A coating composition was made comprising (approximately and by weight): 48 parts of the coating resin; 6 parts of a vinyl chloride-vinyl acetate copolymer resin containing about 90% vinyl chloride and having a molecular weight of about 9,000–10,000 to assist in making the first-mentioned resin flowable and workable on the calendar rolls; 3 parts of white lead carbonate or other stabilizer; 2 parts of lubricant for instance a cracked and dehydrated castor oil; 40 parts of a plasticizer, for instance di(2 ethyl hexyl) phthalate; and 1 part of pigment. All of these materials were thoroughly mixed and worked into a homogeneous composition in a suitable mixer, in this instance a Banbury maintained at a temperature of about 130° C.

It should be understood that one of the features of this invention is that a vinyl resin composition of the type referred to is caused to adhere to the base without adulterating the coating resin with adhesive materials which might degrade the physical properties of the resin or impart stickiness to the exposed surface of the finished article.

Application of coating composition to the treated base

Having treated the base with an impregnating resin of the kind described, application of a coating composition of the substantially insoluble coating resin to give a satisfactory coated base is a relatively simple matter. The coating compositions are merely calendered onto the treated base using such heat as is necessary to soften the compositions sufficiently to allow them to be worked on the calendering rolls, and such pressure as is necessary to press them firmly against the treated base. In the preferred procedure, as previously stated, the base is so treated with a minimum amount of the impregnating resin, that, although the fibers are covered, there is no continuous film on the surface of the base, that is, the base is substantially as open as it was before the treatment with the impregnating resin; and the heat and pressure applied to the coating resin is preferably only that necessary to soften the coating composition and force it into the base. Usually a temperature from about 130° C. to not higher than 160° C. and a corresponding pressure from about 300 pounds per square inch to as little as 100 pounds per square inch, respectively, is all that is required, and it is found that if a textile is so processed, a coating layer will tear before it will release from the treated base even though the coating composition has a tensile strength of 2,000 pounds per square inch and the layer is 0.010 inch thick.

The coating composition may be applied to only one or to both sides of the treated base, as desired. Preferably, the composition is applied to both sides of the base to take advantage of the characteristics of the substantially insoluble resins. When the coating composition is applied to an open textile, for instance 19 ounce duck, from both sides, the composition may be pressed through the openings until the inner surfaces meet but it has been found that these surfaces will not unite readily in cloth which has not been treated with the impregnating resin and each layer of the coating composition can be pulled away from the base without appreciably tearing either the coating layer or the base. However, if the cloth is first treated with the impregnating resin, this resin acts as a welding material under the heat and pressure of the calendering operation to weld together the adjoining surfaces of the coating composition.

A 0.010 inch layer of the previously described coating composition was calendered onto the coutil cloth which had previously been treated with the impregnating resin, in the following manner. The calendering machine, which is diagrammatically illustrated on the accompanying drawing, consisted of an offset roll 10 maintained at about 140° C., adjacent to which was a top roll 11 maintained at about 145° C., adjacent to which was a middle roll 12 maintained at about 150° C., adjacent to which was a bottom roll 13 maintained at about 150° C. A supply of the coating composition 14 was maintained and worked between the offset roll and the top roll which were set to feed through the space between them, a layer of the composition approximately 0.010 inch thick. A layer of the composition adhered to the top roll and passed to the space between the top roll and the middle roll where it was additionally worked to heat and homogenize it. The top roll and middle roll were spaced apart to pass a layer approximately 0.010 inch and the middle roll picked up a layer of the composition of this thickness and calendered it onto one face of the cloth 15 which passed from a cloth reel 16 at the front of the machine between the middle roll and the bottom roll. The middle roll, bottom roll and cloth moved at a speed of about 40 feet per minute. The coated cloth passed around the bottom roll to the front of the machine and over cooling rolls to the take-up roll (not shown) where it was reeled up. At the roll temperatures given, the coating composition was at a temperature of about 150° C. to 155° C. and, although plastic, was so tough that the cloth was under substantial strain. The coating composition having the above formula was not sticky when cooled and the cloth coated therewith cooled quickly and was reeled as soon as cooled. Thus, there was no prolonged dwell for the volatilization of solvent which would have been necessary if solvent coating had been used, and a relatively thick imporous coating was applied at one operation.

The above-described coating operation is continuous and the coating may be applied to both faces of the cloth by repeating the calendering operation. The coating may also be applied by a discontinuous method in which a sheet of the coating composition is formed and sections thereof are then laid against one or both surfaces of the impregnated cloth and joined thereto under the heat and pressure of platens.

Comparative tests of the adhesion of the coating composition to the previously described untreated coutil cloth and to this cloth given different impregnating treatments, were made on a Scott tensile testing machine. In all cases the coating composition was that given in the foregoing example and it was calendered on the cloth as previously described to a thickness of 0.010 inch. The cloth base was from the same roll of coutil cloth in each case.

Sample 1. The coating composition was calendered on untreated cloth but separated from the cloth at a pull of 3.5 pounds per inch.

Sample 2. A 6% solution of a copolymer resin (90% vinyl chloride—10% vinyl acetate and a molecular weight of 16,000) in 94% of acetone was prepared. The cloth was passed through this solution, excess solution scraped off, solvent allowed to volatilize, and coating composition calendered on, all as previously described. The coating separated from the treated cloth at a pull of 3.3 pounds per inch.

Sample 3. A 6% solution of butyl methacrylate in 94% of solvent (18% toluene and 76% acetone) was prepared. A cloth impregnated with this solution and having a calendered coating was prepared by the manipulations previously described. The coating separated from the treated cloth at a pull of 4.6 pounds per inch.

Sample 4. A 6% solution of the previously described maleic acid-vinyl chloride-vinyl acetate copolymer impregnating resin in 94% acetone was prepared. A cloth impregnated with this solution and having a calendered coating was prepared by the manipulations previously described. A pull up to 15 pounds per inch was exerted on the coating and at this pull the coating tore but it did not separate from the treated cloth, that is the adhesion between the coating and the treated cloth was greater than the tear resistance of the coating.

In the matter of preparing the resins and the compositions, the types of acids, anhydrides and partial esters which may be used have been given.

Acetone is the preferred solvent for the impregnating resin because of its low cost and relatively high volatility but any other solvent may be used, for instance methyl ethyl ketone. Slowly volatile solvents, for instance cyclohexanone may be used instead of the dimethyl sebacate for softening the impregnating resin in case it is not applied to the base from a fluid solution. Non-solvent diluents, which may be used with the acetone or other solvents to apply the impregnating resin as a solution or as an emulsion of the resin-solvent mixture or as a dispersion of the resin, are toluene, naphtha and the like. The vinyl chloride-vinyl acetate copolymer having a molecular weight of 9,000-10,000 used in conjunction with the substantially insoluble vinyl resin, is desirable. The lower molecular weight resin is preferably acetone-soluble. It softens and acts as a plasticizer when hot, to give good flow during and at the temperature of calendering, but it is normally a solid and gives body to the composition at normal temperatures. Other materials which can be used in its stead are vinyl resins of low molecular weight, for instance those containing from about 85% to 95% vinyl halide and from 15% to 5% vinyl ester of a lower aliphatic acid with molecular weights from 5,000 to 15,000 with or without such materials as acrylonitrile or maleic acid polymerized therein. Stabilizers other than the lead carbonate are calcium stearate, lead stearate and the like. Calendering lubricants other than the castor oil are stearic acid, lauric acid, cocoa butter and the like. These lubricants may also act somewhat as plasticizers although they are frequently incompatible with the insoluble resins and have a tendency to sweat out. Di(2-ethyl hexyl) phthalate is the preferred plasticizer as it is water insoluble, has an extremely efficient plasticizing action so that only a relatively small amount need be used with the most insoluble of the coating resins, and it exerts its plasticizing action at low temperatures thereby keeping the coating composition rubbery even at the low temperatures and it gives a dry, non-sticky coating. Other plasticizers, for instance tricresyl phosphate, dibutyl phthalate, butyl phthalyl butyl glycollate, acetyl tributyl citrate or other alkyl or aryl phosphates or phthalates, may be used. Pigments, dyes, lakes and other coloring materials may be used as desired as may any of the usual fillers for instance calcium carbonate, clay, aluminum hydrate, carbon black and the like.

The base may be of any porous or fibered material as a textile or fabric, either woven, knitted, felted, matted or picked and made in any manner from natural fibers, either mineral, animal or vegetable or from such synthetic fibers as are not attacked by the resins or solvents and calendering temperatures used. The base may, for instance, be of cotton, wool, worsted, ramie, jute, kapok, linen, natural silk, asbestos, glass wool or any other material equivalent to those mentioned and having similar characteristics. It is contemplated, however, that the invention will be used mostly in connection with woven cotton fabric bases such as are now commonly used for raincoats, tarpaulins, inflatable life rafts and the like.

The process disclosed herein provides an extremely satisfactory coated textile for raincoats, tarpaulins, engine hoods and the like as, in the process of making the coated textile, advantage can be taken of the benefits derived from calendering the substantially insoluble resins and compositions onto the base and, in the final article, for instance a raincoat or a collapsible boat, the advantage of the characteristics of the substantially insoluble resins and compositions is obtained yet the difficulties heretofore experienced both in processes of providing textiles with a coating of these resins and compositions and in the final article are overcome.

From the previous description, it will be seen that a porous and flexible base may be given a substantially imporous, flexible and continuous coating which adheres to the base with excellent tenacity; and that coating compositions utilizing the substantially insoluble vinyl resins may be used, thereby taking advantage of their desirable characteristics, yet the coated bases may be prepared to overcome the undesirable characteristics of these resins, at a low cost and in an expeditious and practical manner by a calendering process instead of numerous solution coatings. The description of the invention has dealt principally with the insoluble resins because they are the most difficult to apply to a base, but the invention is also applicable to and may be utilized in connection with resins of greater solubility with the same advantages of low cost, expeditious procedure and avoidance of solvents. It is evident, therefore, that numerous modifications of and variations in bases, resins, compositions and their components, and manipulative methods may be made; and it is desired that all such modifications and variations be included within the invention as defined in the appended claims.

What is claimed is:

1. Composite material comprising a porous and flexible fibered sheet base, said base carrying within it and interlocked with the fibers of the base and in a discontinuous form, from about 2% to about 30% by weight of the base of an acetone-soluble resinous copolymer of maleic acid, vinyl chloride and vinyl acetate containing from about 0.5% to about 10% by weight of maleic acid and from about 85% to about 90% by weight vinyl chloride, said resinous copolymer having an average molecular weight from about 7,000 to about 15,000, said base also carrying a calendered coating composition comprising a polyvinyl resin and a plasticizer and a fluxing agent, united with said resinous copolymer within the base, the said polyvinyl resin being substantially insoluble, as herein defined, and containing from about 92% to 100% of vinyl chloride polymerized therein and having an average molecular weight from about 40,000 to about 12,000, respectively, the said composition containing from about 30% to about 45% plasticizer and having the characteristics of inability to substantially wet the untreated base at 90° C. and of being substantially non-adherent to the untreated base at 90° C., the plasticizer comprising di(2 ethyl hexyl) phthalate and the said fluxing agent comprising an acetone-soluble polyvinyl resin having an average molecular weight from about 5,000 to about 15,000.

2. Method of producing a composite material which comprises applying within a porous and flexible fibered base a solution of an acetone-soluble resinous copolymer of maleic acid, vinyl chloride and vinyl acetate containing from about 0.5% to about 10% by weight of maleic acid and from about 85% to about 90% by weight of vinyl chloride and having an average molecular weight from about 7,000 to about 15,000, volatilizing the solvent, the said solvent and copolymer being proportioned in the solution to leave within the base and interlocked with the fibers of the base and in a discontinuous form, upon volatilization of the solvent, from about 2% to about 30% by weight of the said copolymer in the treated base, and thereafter calendering onto the base under heat and pressure and uniting with said copolymer within the base, a continuous coating of a composition comprising a polyvinyl resin, a flux and a plasticizer, the said polyvinyl resin being substantially insoluble, as herein defined, and containing from about 92% to 100% of vinyl chloride polymerized therein and having an average molecular weight from about 40,000 to about 12,000, respectively, the said composition containing from about 30% to about 45% of plasticizer and having the characteristics of inability to substantially wet the untreated base at 90° C. and of being substantially non-adherent to the untreated base at 90° C., the plasticizer comprising di(2 ethyl hexyl) phthalate and the flux comprising an acetone-soluble polyvinyl resin having an average molecular weight from about 5,000 to about 15,000.

FRED W. DUGGAN.

REFERENCES CITED

The following references are of record in the file of this patent:

UNITED STATES PATENTS

| Number | Name | Date |
|---|---|---|
| 1,933,052 | Fikentscher | Oct. 31, 1933 |
| 2,070,600 | Jenett | Feb. 16, 1937 |
| 2,186,454 | Gloor | Jan. 9, 1940 |
| 2,222,956 | Seaton | Nov. 26, 1940 |
| 2,230,876 | Wysong | Feb. 4, 1941 |
| 2,275,957 | Groff | Mar. 10, 1942 |

FOREIGN PATENTS

| Number | Country | Date |
|---|---|---|
| 508,822 | Great Britain | July 6, 1939 |